(12) United States Patent
Bandy et al.

(10) Patent No.: US 7,327,283 B2
(45) Date of Patent: Feb. 5, 2008

(54) SYSTEM AND APPARATUS FOR FLIGHT DECK MODULE INTEGRATION

(75) Inventors: Paul W. Bandy, Kent, WA (US); Darrell W. Gaston, Everett, WA (US); Toan D. Le, Lynnwood, WA (US); Dwight R. Schaeffer, Mercer Island, WA (US); Robert W. Metzger, Marysville, WA (US); Dai H. Pham, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 199 days.

(21) Appl. No.: 11/199,043

(22) Filed: Aug. 8, 2005

(65) Prior Publication Data

US 2007/0030172 A1 Feb. 8, 2007

(51) Int. Cl.
*G08B 21/00* (2006.01)
(52) U.S. Cl. .................. 340/945; 340/971; 340/815.45
(58) Field of Classification Search ................ 340/945, 340/971, 973, 815.45; 362/800, 330, 362
See application file for complete search history.

(56) References Cited

U.S. PATENT DOCUMENTS 5,016,147 A  5/1991  Voorhees ..................... 362/99
6,587,056 B1 * 7/2003  Fraser et al. ................. 340/945
2003/0214242 A1  11/2003  Berg-johansen .......... 315/169.3
2004/0145558 A1  7/2004  Cheng ......................... 345/102
2005/0264529 A1 * 12/2005  Morgan et al. ............. 345/160
2005/0284984 A1  12/2005  De Lauzun et al. ...... 244/129.1
2006/0184253 A1 * 8/2006  Andrews et al. .............. 700/17

FOREIGN PATENT DOCUMENTS

EP     1021074    7/2000
GB     2359178    8/2001

* cited by examiner

*Primary Examiner*—Toan N. Pham
(74) *Attorney, Agent, or Firm*—Klein, O'Neill & Singh, LLP

(57) ABSTRACT

An integrated communication system in an aircraft is provided. The system includes a plurality of solid state flight deck modules in an integrated flight deck panel, wherein the solid state flight deck modules include a microcontroller for interfacing with at least one data bus controller via a local bus; and a light emitting diode (LED) module for controlling backlit illumination of the integrated flight deck panel. The controller sends information to plural solid state flight deck modules via local buses and uses a system bus to communicate with aircraft subsystems. The controller also uses a central power supply module to supply regulated power to the plural solid state flight deck modules. Furthermore, at least one solid state flight deck module includes an integrated panel brightness control module, master brightness control module and/or a master dim and test control module.

15 Claims, 4 Drawing Sheets

SYSTEM AND APPARATUS FOR FLIGHT DECK MODULE INTEGRATION

BACKGROUND OF THE INVENTION

1. Field of the Invention

The present invention relates to integrating flight deck modules, and more particularly, to integrating and simplifying Solid State Flight Deck Modules in transport systems, for example, aircrafts.

2. Background

Flight Deck Modules:

The flight deck area of an airplane (cockpit) includes a large number of devices for flight crew control and monitoring of different aircraft subsystem functions such as climate control, air conditioning, electrical power systems, window heat, passenger signs, anti-ice systems, hydraulics, cargo heat, bleed air, and fuel systems and other systems. These devices (various types of switches, small displays, backlit annunciators, relays, gauges, etc.) are arranged in modules which can be removed and replaced on the flight line (may also be referenced as "Line Replaceable Units" or "LRUs").

Flight deck modules (or "units", the term module and units is used interchangeably throughout this specification) are grouped together and attached to a structure often referred to as panels, which are located in view and reach of the flight crew. The modules are connected through wiring to relays, valves, motors, and electronic LRUs.

The flight deck modules receive aircraft AC and DC power for switching and powering various components. The DC power is typically 28 VDC, but the voltage is not regulated and can vary over a wide range, for example, from 16 VDC to 32 VDC.

Panel Lighting:

The flight deck modules typically contain lightplates on their front face, which provide backlit nomenclature (indicia or system) describing the function of the devices. The lightplates are typically made of clear polycarbonate, which are painted first with white paint, then with a dark paint. The dark paint is etched away to form the nomenclature. Light shines from the back of the lightplate through the polycarbonate and the white paint where the nomenclature is etched. Lightplates receive modulated 5 VAC power for the backlighting from Dimming Control Units (DCUs) (108, FIG. 1). Potentiometers or rheostats located on a flight deck module in each panel area provide a continuously variable signal to the DCUs (108). DCU 108 convert 115 VAC power to 5 VAC, and then truncate each half sine waves in proportion to a signal from the potentiometer or rheostat, thereby modulating the root mean square (RMS) voltage level of 5 VAC power to effect different levels of lightplate lighting brightness. A commercial airplane typically uses about 20 DCUs. Small displays and gauges also have adjustable backlighting which use DCU 108 power.

The brightness of all panels can optionally be raised or lowered together by sending a signal to all DCUs that is summed with the individual panel brightness control signal. This signal originates from a Master Brightness Control (MBC) module (109, FIG. 1). The MBC module processes a signal from ambient light sensors and mixes it with a master brightness rheostat or potentiometer.

Annunciators:

Flight deck modules also use annunciators, which have bright backlit nomenclature to alert the pilot of abnormal conditions. The nomenclature is typically not visible when the annunciators are not backlit. The alerts (backlit nomenclature) are in different colors indicating the severity of the abnormality and how quickly the pilot should take corrective action.

Typically, the annunciators have two levels of brightness, dim for night time ambient conditions and bright for sunlight ambient light and testing. Annunciators receive power from a Master Dim and Test (MD&T) system (107, FIG. 1), which sends unregulated 28 VDC power for the Bright and Test modes, and 12 VDC regulated power (sometimes dim voltage power is produced by a diode placed on a 28 VDC source to reduce the voltage) for the Dim Mode. The flight crew selects the mode by using a three-position switch, which sends signals to the MD&T system. The test position commands bright mode power to all the annunciators and closes ground paths from all the annunciators at the same time. When not in Test Mode, the ground paths for individual annunciators are closed by electronic LRUs or circuitry, which detects the abnormal conditions.

Any one annunciator receives power from a single MD&T assembly (107, FIG. 1). Different annunciators on a single module may receive power from different MD&T modules.

Typically, all MD&T modules receive power from main DC buses (2 to 4 different busses), but some aircrafts power MD&T modules with a battery backed up bus. Typically, an aircraft has at least one MD&T assembly for each different DC bus, and often as many as 20, depending on the number of annunciators and the capacity of the individual MD&T Dim power control circuit (power supply for regulated dim power).

Communications Network:

In conventional aircrafts, plural (sometimes thousands) discrete wires connect the flight deck with subsystems in other parts of the airplane. New aircraft designs have tried to reduce fabrication and installation costs, weight and volume by employing data busses.

FIG. 1 shows an example of a conventional system 100 that attempts to integrate the flight deck modules with other subsystems. The flight deck (with modules 101) is connected to other electronics through redundant system data busses, which link multiple destinations to the flight deck. Data bus controllers (for example "Overhead Panel Bus Controller 105" in FIG. 1) receive and transmit digital data from local data busses connected to the data concentrators 104. The data concentrators 104 ("Panel data concentrator(s) 102" and "Overhead Panel card files 103" in FIG. 1) convert analog and discrete data into digital data; and digital data to analog and discrete data. Analog and discrete signals are generated by plural components within the flight deck modules (101).

Turning to FIG. 1 in more detail, flight deck modules 101 are coupled to a separate overhead panel ARINC 629 system (OPAS) 112. OPAS 112 includes plural overhead panel interface card (OPIC) 104 and plural overhead panel bus controllers (OPBC) 105. OPIC 104 include plural panel data concentration units 102 and overhead panel cardfiles 103 that interface between flight deck modules and OPBC 105. Output from OPAS 112 is sent to LRUs 106.

As discussed above and shown in FIG. 1, the flight deck modules 101 use several MD&T modules 107 and DCUs 108. DCUs 108 use a variable 0 to 5 VAC signal to control panel lightplate brightness. The MD&T units 107 output a 28 $V_{dc}$ unregulated, or a regulated 12 Volt signal to control annunciator brightness level. MBC module 109 is also coupled to DCUs 108 and can control the brightness of all panels. The voltage sources (28 VAC) and (115 VAC) are shown as 110 and 111.

Conventional integration of flight deck modules has shortcomings. For example, the numbers of wires and components involved in integrating flight deck modules result in a complicated and difficult to maintain design. The use of plural DCUs and MD&Ts also result in a complex design. Furthermore, the way power is distributed among the various modules can result in electromagnetic interference that can be harmful to other electronics being used in the aircraft. The present approach (with numerous wires, power sources, and plural components) can also result in high heat dissipation that can result in overheating and cause damage to the panels/aircraft.

Therefore, there is a need for a system to integrate flight deck modules in a simplistic design reducing the need for discrete wiring and plural components.

SUMMARY OF THE INVENTION

In one aspect of the present invention, an integrated communication system in an aircraft is provided. The system includes a plurality of solid state flight deck modules in an integrated flight deck panel, wherein the solid state flight deck modules include a microcontroller for interfacing with at least one data bus controller via a local bus; and a light emitting diode (LED) module for controlling backlit illumination of the integrated flight deck panel.

The controller sends information to plural flight deck modules via local buses and uses a system bus to communicate with aircraft subsystems. The controller also uses a central power supply module to supply regulated power to the plural solid state flight deck modules.

In another aspect of the present invention, at least one flight deck module includes an integrated panel brightness control module, master brightness control module and/or a master dim and test control module.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

The following detailed description is of the best currently contemplated modes of carrying out the invention. The detailed description is not to be taken in a limiting sense, but the detailed description is made merely for the purpose of illustrating the general principles of the invention, since the scope of the invention is best defined by the appended claims.

In one aspect of the present invention, a system for integrating flight deck modules and providing communications between the flight deck modules and electric/electronic equipment located elsewhere in an airplane is provided. The system includes Solid State Flight Deck Modules, local data buses between microcontrollers in the flight deck modules, and bus controllers that communicate to other subsystems over system data buses.

In yet another aspect of the present invention, an apparatus for integrating the brightness control for LED panel backlighting and annunciator lighting is provided without the need for separate LRUs.

In another aspect of the present invention, an apparatus is provided for distributing power and data between the flight deck modules and bus controllers. The system enables deleting a large number of separate LRUs that are used by conventional systems to convert digital and analog data, and to control panel dimming for master brightness control, and to dim and test a large number of annunciators installed in flight deck modules.

In yet another aspect of the present invention, the system reduces discrete wiring between modules. This reduces cost, volume, weight, EMI interference, maintenance and improves overall lighting quality and system reliability.

Figure 2:
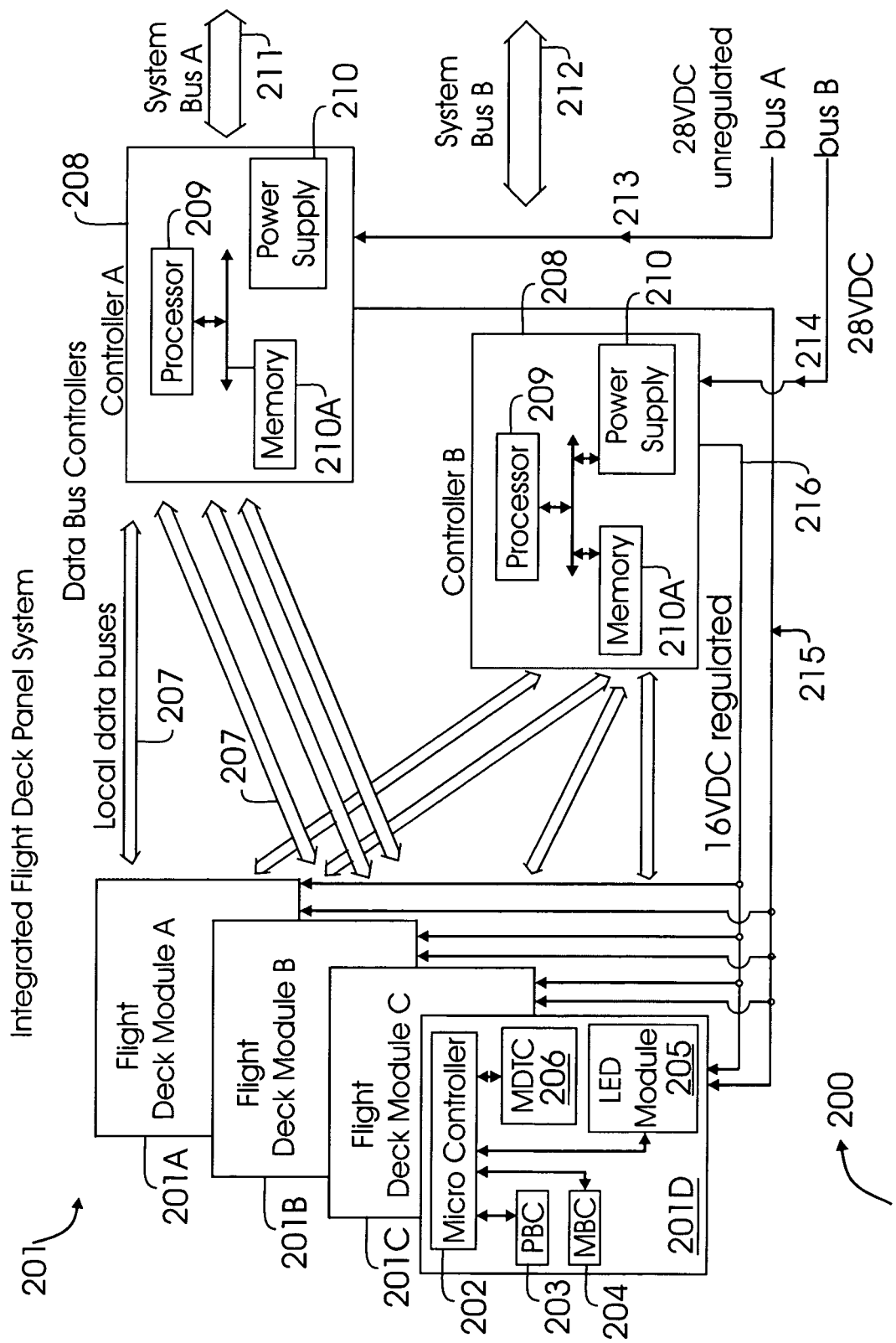
FIG. 2 is a block diagram of an integrated system, according to one aspect of the present invention.

System Overview:

FIG. 2 shows a block diagram of an integrated system 200, according to one aspect of the present invention. System 200 includes plural solid state flight deck modules (201A-201D) in a panel 201 are integrated with data bus controllers 208 via local buses 207. Fight deck modules (201A-201D) include a microcontroller 202 that interfaces with other components and performs various functions, described below in detail.

It is noteworthy that the present invention is not limited to any particular type/number of microcontroller(s), processor or the like. A state machine in an application specific integrated circuit may also be used to achieve the overall integration.

At least one of the flight deck modules in panel (201) includes a panel brightness control ("PBC") module 203 that controls the overall panel lighting, as described below. A flight deck module in panel 201 also includes a master brightness controller ("MBC") 204 for controlling the overall panel brightness. Flight deck modules also includes a LED regulating module 205 (may be referred to as LED module 205) that is described below in detail.

Each flight deck module (for example, 201A) communicates with other flight deck modules and data bus controllers 208 (shown in FIG. 2 as controller A and controller B (208), and may be referred to as "controller 208" and/or "bus controllers 208") via local buses 207.

Controller 208 includes a processor 209 that can execute firmware instructions from memory 210A. Controller 208 performs data bus control, conversion and overall fault monitoring and interfaces with other subsystems. System bus 211 and 212 are used to move information to and from the controllers 208 to other sub-systems (not shown).

Controller 208 uses a central power supply module 210 that receives un-regulated 28 VDC (shown as 213 and 214) to power plural components of system 200. Power supply module 210 supplies power to the connected flight deck modules (shown as regulated 16 VDC (215 and 216).

Different local data bus architectures can be used in the adaptive aspects of the present invention. The architecture shown in FIG. 2 is a bi-direction point-to-point system, which forms a star network. Each flight deck module communicates with the bus controllers (via buses 207). Controllers 207 then sends information (control, data and/or address) on system buses 211 and 212 or rebroadcasts the data on the local buses (207) to other flight deck modules. Keeping the microcontroller data bus duties simple, allows for common microcontroller software and an on-board microcontroller transmitter/receiver instead of additional data bus components.

It is noteworthy that the present invention is not limited to any particular number/type of local (207)/system buses (211 or 212); or to the total number/type of controllers 208.

Figure 1:
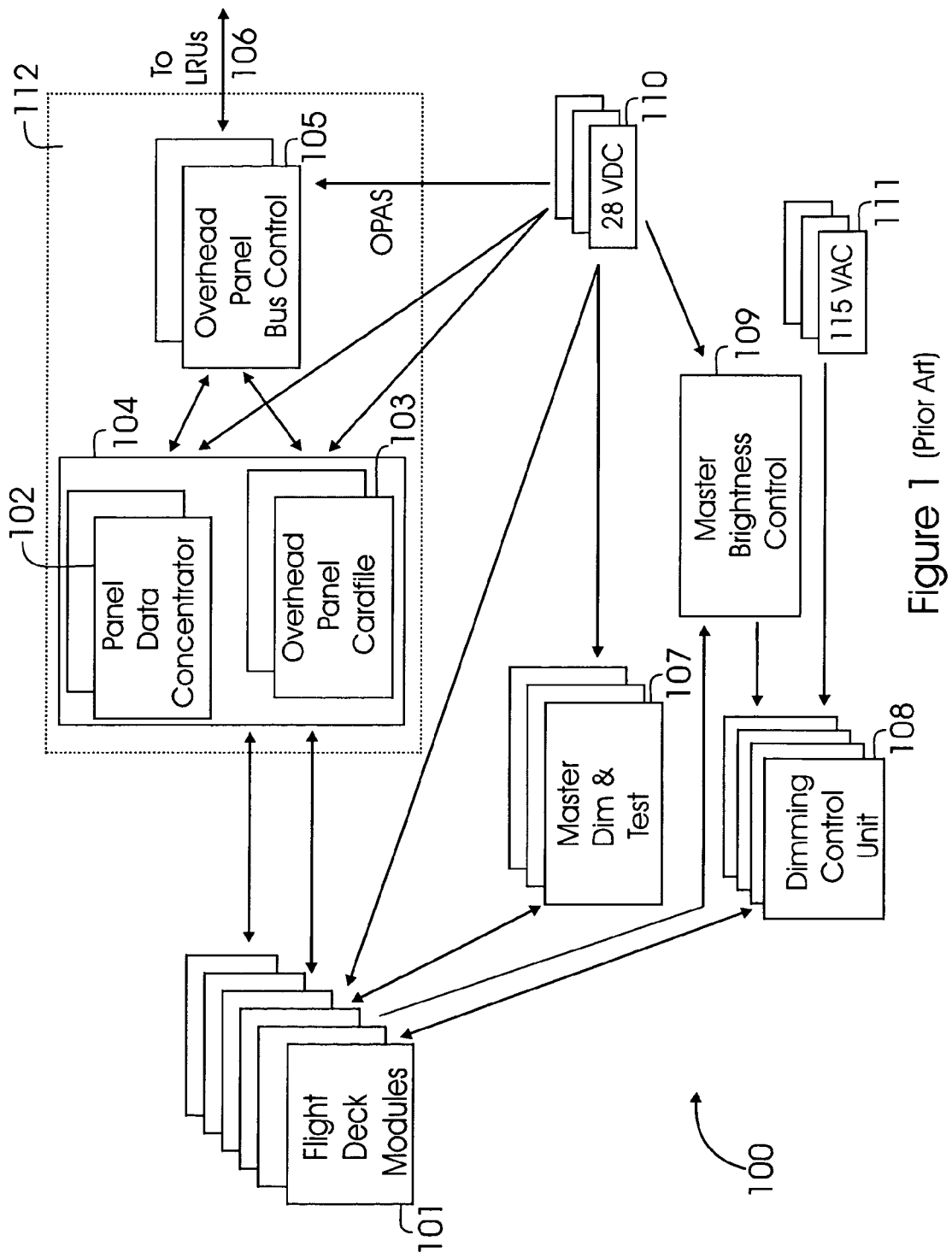
FIG. 1 shows a block diagram of an existing conventional system for using flight deck modules.

Communications System:

In one aspect of the present invention, the Data concentrators of FIG. 1 (Panel data concentration 104 and Overhead Panel Cardfile 103) are eliminated by using microcontrollers (202) in the flight deck modules to perform the analog/discrete to digital and digital to analog/discrete conversions. Moving data concentration functionality to microcontroller 202 eliminates the need for discrete wiring for handling analog/discrete signals and the need for data concentrator LRUs. The discrete wiring can be replaced by traces in the flight deck modules.

Panel Lighting:

As stated earlier, AC power for panel lighting is used in conventional systems to provide long incandescent filament life. The present invention may use light emitting diodes (LEDs), which provide illumination output that is dependent upon current. For example, an LED may produce zero illumination output (off) when no current is provided to the LED, a dim illumination output when some current is provided to the LED, a predetermined illumination output when a predetermined amount of current is provided to the LED, and a high illumination output (bright) when a high amount of current is provided to the LED. The use of LEDs is described below in detail with respect to FIG. 4.

By using LEDs instead of incandescent bulbs, the use of AC power is eliminated, along with the EMI AC power and the AC RMS voltage modulation in the DCUs 108. Instead of sending analog brightness control signals to the DCUs 108, microcontroller 202 in the flight deck module containing the panel brightness module 203 (that replaces Potentiometer/rheostat components) converts the analog brightness control signal into a digital signal and transmits the digital signal to controller 208, which then retransmits the signal to other flight deck modules on the same panel (for example, 201). Microcontroller 202 in the receiving flight deck modules convert the signal into a reference voltage that is used by the LED module 206, as described below.

Master Brightness Controller 109 of FIG. 1 as a LRU is also eliminated because the microcontroller 202 performs the same functions with the integrated MBC module 204. Analog signal from the MBC module 204 and ambient light sensors (not shown) are converted to a digital signal by microcontrollers (202) in the same panel. The digital signal is sent to the bus controllers (208) via local buses 207. The bus controllers (208) mix the ambient light and master brightness control signals and combine them with individual panel brightness signals before transmitting the combined brightness signals to other modules.

It is noteworthy that standard analog to digital converters and digital to analog converters (not shown) are provided on the flight deck modules for the foregoing conversions controlled by microcontrollers 202.

By eliminating the distribution of low voltage, high current power from DCUs 108 to the flight deck modules, line losses and corresponding brightness changes are eliminated. This also eliminates the need and cost of rebalancing the lighting to provide uniform brightness by using excess wire length and/or inserting diodes.

Power Architecture:

LRD module (LED Control Module) 205 uses current regulator circuits that are sized (the number of LEDs in series) for the lowest voltage provided by the unregulated power source to assure proper operation over a power range. Any voltage in excess of the minimum voltage is dissipated as heat in the vicinity of the LEDs, which degrades LED life (as well as the life of other electronic components). An unregulated 28 VDC nominal power source with a 16 to 32 volt range would nominally dissipate the energy associated with 12 volts and up to 16 volts. The problem may reduced by installing high efficiency switching power supplies in each module, located away from the LEDs, to produce a regulated voltage equal to the lower end of the range (i.e. 16 VDC). However, switching power supplies are relatively expensive. As shown in FIG. 2, less power dissipation in the flight deck modules and lower cost is achieved by providing central power supplies for all system applications, and then distributing the regulated power.

FIG. 2 depicts central power supply modules 210 (one for each power bus providing power to the modules) in controllers 208. Power supply module 210 provides dual voltages, a low voltage to support the active electronics in the bus controller (such as 2.7, 3.3, or 5 VDC) and a higher voltage suitable for distribution to the flight deck modules and to power the data busses, such as 16 VDC (215 and 216).

Annunciator Brightness Control:

In yet another aspect of the present invention, the MD&T modules 107 are eliminated similar to the DCUs 108. Master Dim and test control module 206 (MDTC 206) is integrated with a flight deck module (shown as 210D) and sets the MD&T mode (bright, dim, or test). MDTC 206 sends mode information to the microcontroller 202, which transmits the mode information to the bus controller 208. The bus controller 208 then retransmits the discrete signals via buses 207 to the microcontrollers in other flight deck modules. The micro controllers 202 send the appropriate bright or dim reference voltage to the LED module 205. When the test mode is selected, microcontroller 202 closes ground paths for the LED modules 205 locally to turn on the annunciators.

Printed Circuit Board Power and Data Distribution:

Printed circuit board technology has been developed to enable large (for example, 6 feet by 3 feet) and thick circuit boards. This allows use of circuit boards to distribute signals and power for all modules on a panel (201) in lieu of discrete wiring, such as depicted on FIG. 3.

Figure 3:
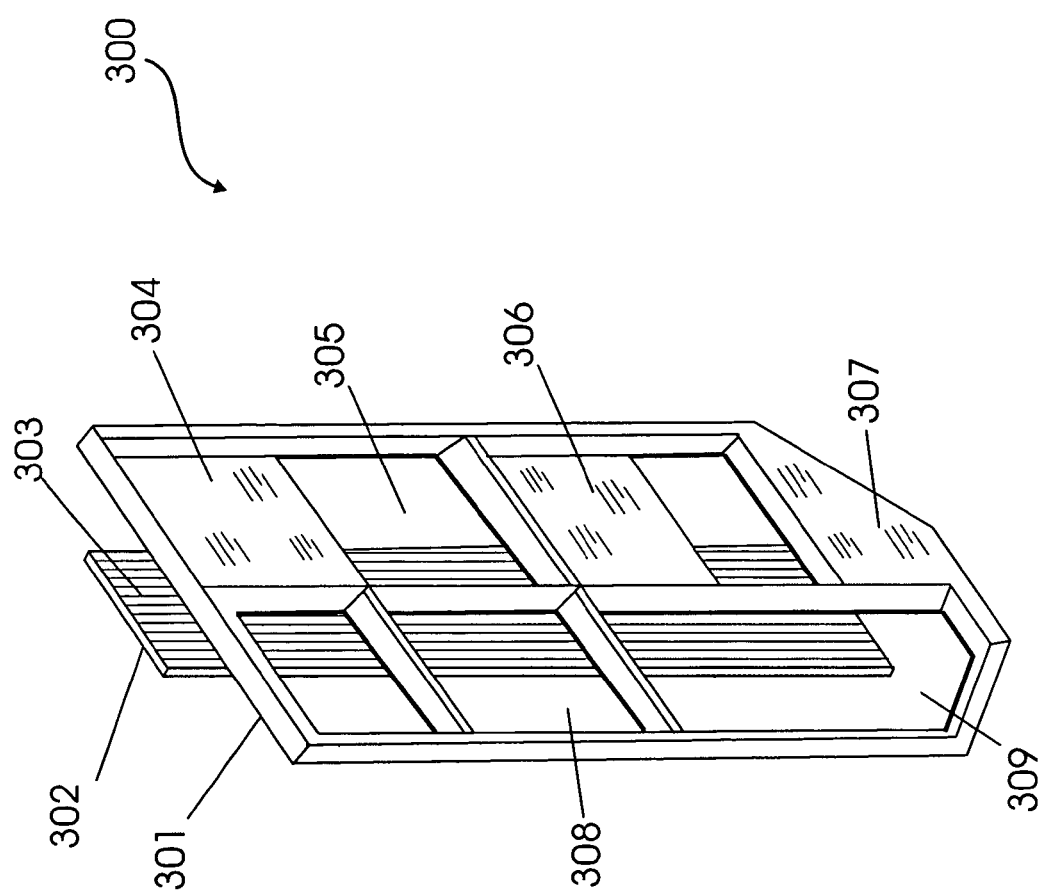
FIG. 3 is a perspective view of an apparatus for integrating flight deck modules, according to an embodiment of the present invention.

Apparatus 300 as shown in FIG. 3 receives plural flight deck modules (shown as 304, 305, 306, 307, 308 and 309, similar to 201A-201D). A circuit board 302 with connectors 303 is also provided. Flight deck modules are attached to the frame 301 and connectors (not shown) on the rear of the flight deck modules mate with the connectors (303) on the printed circuit board 302. Connectors 303 are attached to the circuit board preferable by press fit.

The high degree of automated printed circuit board fabrication saves cost compared to discrete wiring. Very thick boards allow a high degree of separation for many signals by assigning unique separation codes to each layer. Ground planes between signal layers attenuate EMI propagation between signals on different layers. The use of large printed circuit boards in lieu of wiring to integrate flight deck modules reduces the overall cost of the panel.

Figure 4:
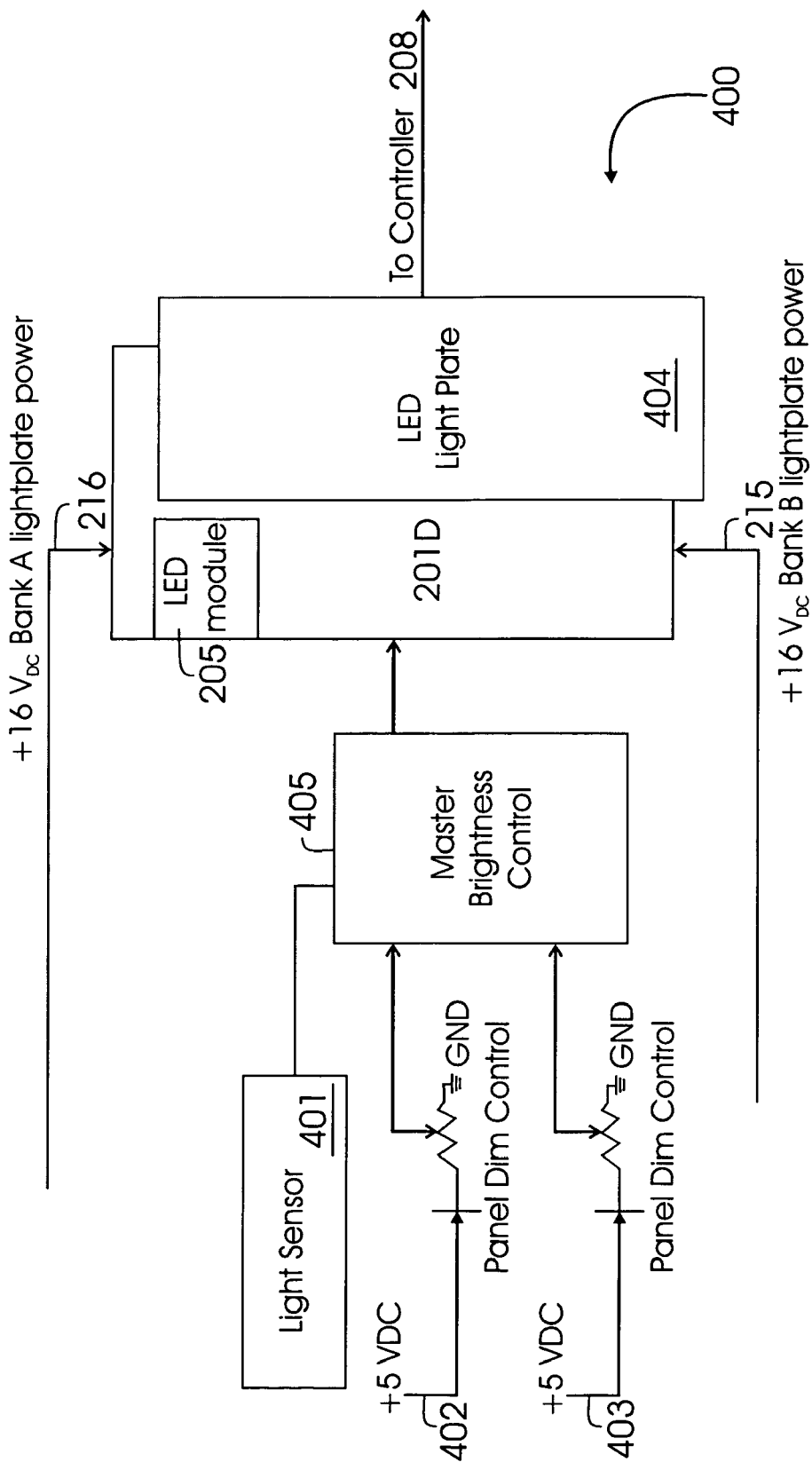
FIG. 4 shows a block diagram for using LEDs in one aspect of the present invention.

Backlight Control System:

FIG. 4 shows a block diagram of an apparatus/system 400 for controlling backlight illumination of a flight deck module (201D) using LED module 205. Apparatus 400 is a subset of system 200 shown in FIG. 2.

The apparatus 400 includes a solid state flight deck module 201D, which is illuminated from behind with an LED lightplate 404. The LED lightplate 404 may be mounted adjacent to the flight deck module 201D. The LED lightplate 404 uses LEDs which have current control circuits to control LED lightplate 404 light intensity.

An optional master brightness control module/unit 405 (similar to 204) may be operationally connected to module 201D to provide a lightplate intensity control signals to various flight modules; the master brightness control unit 405 is an optional unit which provides auto light adjustment (using sensor 401) and/or input signal averaging function. Backlight illumination is controlled internally with respect to the flight deck module 201D. One or more panel dim control signals 402 and 403 may also be operationally connected to the master brightness control unit 405.

The apparatus 400 is advantageous over the conventional lightplate power designs as the conventional designs have excessive line losses, which have an impact on light intensity. As discussed above, conventional lighting structures use dimmer units to control flight deck panel light output by varying DCU output voltage. However, the voltage losses (losses in the wiring) would cause differences in lighting between panels, which requires manual adjustments to balance the lighting output. This is eliminated by using the apparatus 400 of FIG. 4.

In one aspect of the present invention, installation cost is reduced and the overall depth to install these panels is reduced. Therefore, the present system reduces overall aircraft cost/maintenance cost.

Although the present invention has been described with reference to specific embodiments, these embodiments are illustrative only and not limiting. Many other applications and embodiments of the present invention will be apparent in light of this disclosure and the following claims.

What is claimed is:

1. An integrated communication system in an aircraft, comprising:
   a local bus;
   a data bus controller; and
   a plurality of solid state flight deck modules in an integrated flight deck panel, including a microcontroller configured to interface with the data bus controller via the local bus, and a light emitting diode (LED) module configured to control backlit illumination of the integrated flight deck panel.

2. The system of claim 1, wherein the controller is configured to send information to the solid state flight deck modules via a plurality of local buses, including said local bus, and is configured to communicate with aircraft subsystems via a system bus.

3. The system of claim 1, wherein the controller is configured to use a central power supply module to supply regulated power to the solid state flight deck modules.

4. The system of claim 1, wherein at least one of the solid state flight deck modules includes an integrated panel brightness control module.

5. The system of claim 1, wherein at least one of the solid state flight deck modules includes an integrated master brightness control module.

6. The system of claim 1, wherein at least one of the solid state flight deck modules includes an integrated master dim and test control module.

7. The system of claim 1, wherein a printed circuit board connects the plural solid state flight deck modules.

8. An integrated flight deck panel, comprising:
   a local bus;
   a data bus controller; and
   a plurality of solid state flight deck modules, including a microcontroller for interfacing with the data bus controller via the local bust and a light emitting diode (LED) module configured to control backlit illumination of the integrated flight deck panel.

9. The panel of claim 8, wherein the controller is configured to send information to the solid state flight deck modules via a plurality of local buses, including said local bus, and is configured to communicate with aircraft subsystems via a system bus.

10. The panel of claim 8, wherein the controller is configured to use a central power supply module to supply regulated power to the solid state flight deck modules.

11. The panel of claim 8, wherein at least one of the solid state flight deck modules includes an integrated panel brightness control module.

12. The panel of claim 8, wherein at least one of the solid state flight deck modules includes an integrated master brightness control module.

13. The panel of claim 8, wherein at least one of the solid state flight deck modules includes an integrated master dim and test control module.

14. The panel of claim 8, wherein a printed circuit board connects the plural solid state flight deck modules.

15. An integrated flight deck panel in an aircraft, comprising:
   a local bus:
   a data bus controller; and
   a plurality of solid state flight deck modules;
   wherein each module includes a microcontroller and a light emitting diode (LED) module, each microcontroller being configured to interface with the data bus controller via the local bus, and each LED module being configured to control backlit illumination of the integrated flight deck panel.

* * * * *